United States Patent
Mar et al.

(10) Patent No.: US 9,858,606 B1
(45) Date of Patent: Jan. 2, 2018

(54) INTEGRATED KNITTED TEXTILES SYSTEM AND METHOD

(71) Applicants: Conrad Sing Mar, Seattle, WA (US);
April Lee Liang, Malibu, CA (US);
Garrett Li Gerson, Malibu, CA (US)

(72) Inventors: Conrad Sing Mar, Seattle, WA (US);
April Lee Liang, Malibu, CA (US);
Garrett Li Gerson, Malibu, CA (US)

( * ) Notice: Subject to any disclaimer, the term of this patent is extended or adjusted under 35 U.S.C. 154(b) by 0 days.

(21) Appl. No.: 15/344,535

(22) Filed: Nov. 6, 2016

(51) Int. Cl.
*G06Q 30/00* (2012.01)
*G06Q 30/06* (2012.01)
*G06Q 10/08* (2012.01)
*D04B 15/66* (2006.01)

(52) U.S. Cl.
CPC ......... *G06Q 30/0621* (2013.01); *D04B 15/66* (2013.01); *G06Q 10/0833* (2013.01); *G06Q 30/0633* (2013.01); *G06Q 30/0643* (2013.01)

(58) Field of Classification Search
CPC .......................................... G06Q 30/06–30/08
USPC ............................................... 705/26.1–27.2
See application file for complete search history.

(56) References Cited

U.S. PATENT DOCUMENTS

| | | | |
|---|---|---|---|
| 2002/0099583 A1* | 7/2002 | Matusek | G06Q 10/06 705/7.25 |
| 2014/0277683 A1* | 9/2014 | Gupta | G06F 17/50 700/132 |

* cited by examiner

Primary Examiner — Ethan D Civan
(74) Attorney, Agent, or Firm — Edmond DeFrank

(57) ABSTRACT

The embodiments disclose an integrated knitted textiles system and method including a knitted textile consumer variation website for processing variation knitted garment orders and production, an integrated knitted textiles variation ecommerce web application for consumer use in selecting knitted garment variation and ordering on the knitted textile consumer variation website, a variation order processing server for processing consumer variation selection orders and creating knitted garment variation production instructions, an order tracking processor for consumer variation selection order production sequencing and order tracking, at least one integrated knitted textiles variation knitting machine adaptation for creating interactive processing and knitting machine communications, and at least one production variation instruction processor for converting consumer variation selections into adapted knitted machine instructions.

20 Claims, 15 Drawing Sheets

CONSUMER CREATING AN ACCOUNT — 400

410 / 416 / 402 SIGN IN / 404

Account Information

First name

Last name

Email address

○ Subscribed to Newsletter — 418

Account Password — 420

Old password

New password

Confirm password

[SAVE CHANGES] — 425

Account
Account Details
Order History
Addresses
Logout

FIG. 4A

440 / 402 SIGN IN / 404

Addresses

First name | Last name

Company (optional)

Street address — 460

Country — 461 | State or Province | Zip or Postal Code — 463
Select or Begin typing | Select or Begin typing — 462

City — 464 | Phone — 465

○ Set as default billing address — 470
○ Set as default shipping address — 472

[ADD AN ADDRESS] — 480  [SAVE CHANGES] — 425

Account
Account Details
Order History
Addresses
Logout

FIG. 4B

INTEGRATED KNITTED TEXTILES SYSTEM AND METHOD

BACKGROUND

Mechanized knitting of fabrics and apparel has been a commercially available technology for a long time. Changing fashions and consumer desired products have created a void in available knitted fabrics and apparel commercially available. Apparel styles change frequently and new technologies for medical treatments, personal comfort, and advances in electronics can be integrated into the knitted fabrics and apparel and made available to consumers commercially if they can be made affordably and over a great array of designs and types of apparel. What is needed is a new generation of mechanized knitting machines with integrated controls to affordably integrate the fabrics and apparel production with over a vast selection of fabrics, styles and apparel variations to fit the changing fashions and consumer desired products.

BRIEF DESCRIPTION OF THE DRAWINGS

FIG. 4A shows a block diagram of an overview flow chart of web application consumer account page of one embodiment.

FIG. 4B shows a block diagram of an overview flow chart of web application consumer addresses page of one embodiment.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the embodiments.

General Overview:

It should be noted that the descriptions that follow, for example, in terms of an integrated knitted textiles system and method is described for illustrative purposes and the underlying system can apply to any number and multiple types knitting machines, yarns, and knitted apparel and products. In one embodiment, the integrated knitted textiles system and method can be configured using multiple yarns created for integrated functions incorporating a consumer's variation selections. The integrated knitted textiles system and method can be configured to include specialized fixtures to perform knitted variation patterning and can be configured to include multiple types knitting machines CNC accessories paired with the integrated control systems. The terms "apparel" and "garment" may be used interchangeably herein without changing the meanings of one embodiment.

Figure 1:
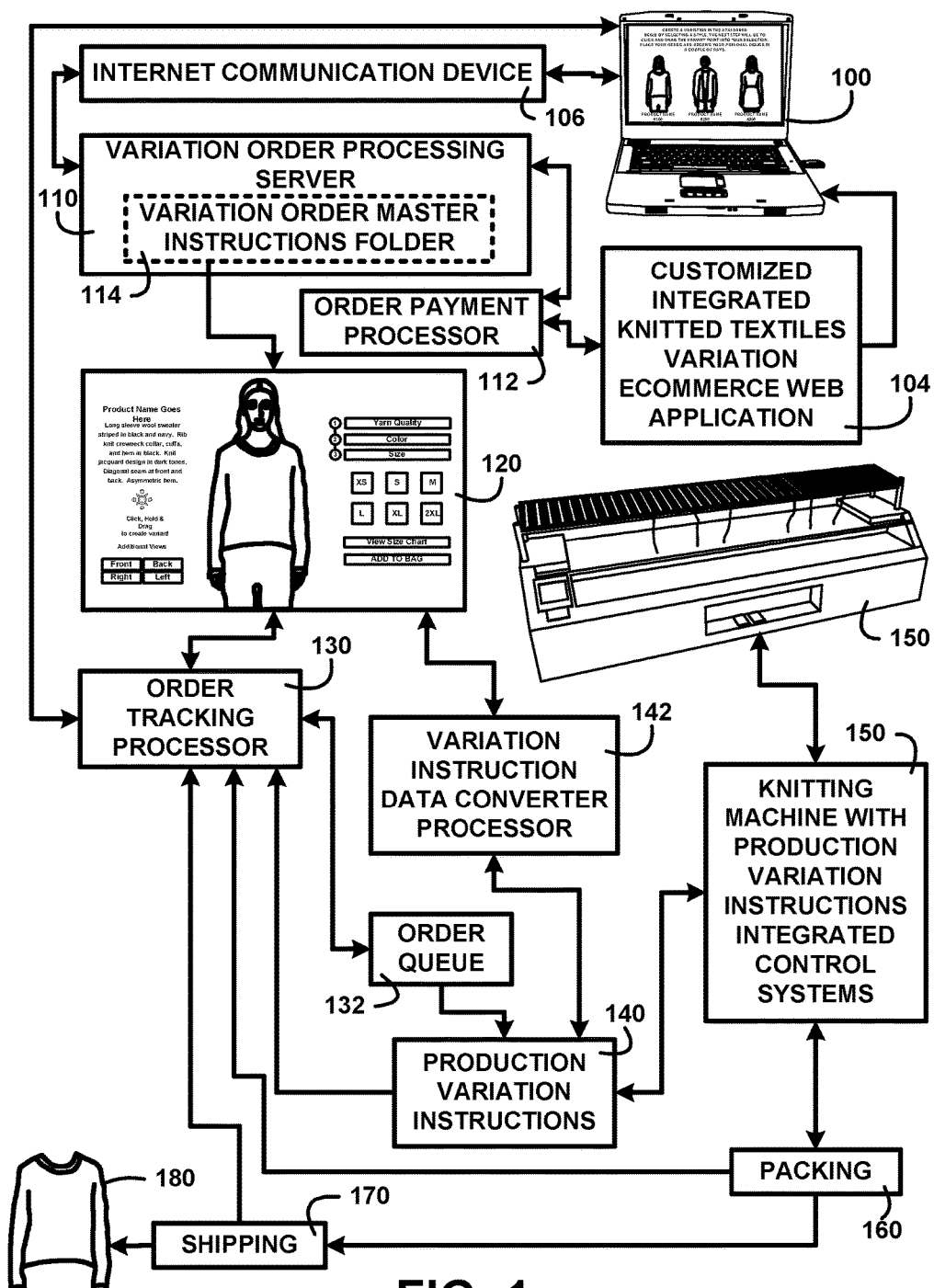
FIG. 1 shows a block diagram of an overview of integrated knitted textiles system and method of one embodiment.

FIG. 1 shows a block diagram of an overview of integrated knitted textiles system and method of one embodiment. FIG. 1 shows a knitted textile consumer internet device logged into variation website 100 using an integrated knitted textiles variation ecommerce web application 104. The integrated knitted textiles variation ecommerce web application 104 communicates with a variation order processing server 110 using an internet communication device 106. The consumer logs into the variation order processing server 110. The variation order processing server 110 processes the consumer queries on the variation website to select an apparel style and variations to individualize the garment to suit the consumer's desired changes for an order. A consumer variation order selection 120 is made and transmitted to the variation order processing server 110. The price of the order with variations is calculated, transmitted to and displayed on the consumer internet device. The consumer inputs payment data. The variation order processing server 110 processes the payment using an order payment processor 112. Upon a successful payment the consumer order is recorded using an order tracking processor 130 and processed into an order queue 132 of one embodiment.

The variation order processing server 110 processes the consumer style and variation selections, and records variation data files in a variation order master instructions folder 114 converting the data into production variation instructions 140 using a production variation instruction data converter processor 142 for converting consumer variation selections into adapted knitted machine instructions. The converted data is transmitted to a knitting machine with production variation instructions integrated control systems 150 when the consumer order queue production position is reached. The consumer garment is knitted on the knitting machine with production variation instructions integrated control systems 150 incorporating the consumer selected variations of one embodiment.

Upon garment completion the order tracking processor 130 transmits garment packing 160 instructions and the garment is packed for shipping. When the packing 160 is completed the order tracking processor 130 transmits garment shipping 170 instructions including the consumer inputted shipping address data. The order tracking processor 130 records the shipping 170 tracking code in the variation order processing server 110. A consumer ordered garment is delivered to consumer 180. During the order processing the consumer can log into the customized integrated knitted textiles variation ecommerce web application 104 and follow the progress of their order of one embodiment.

Figure 2A:
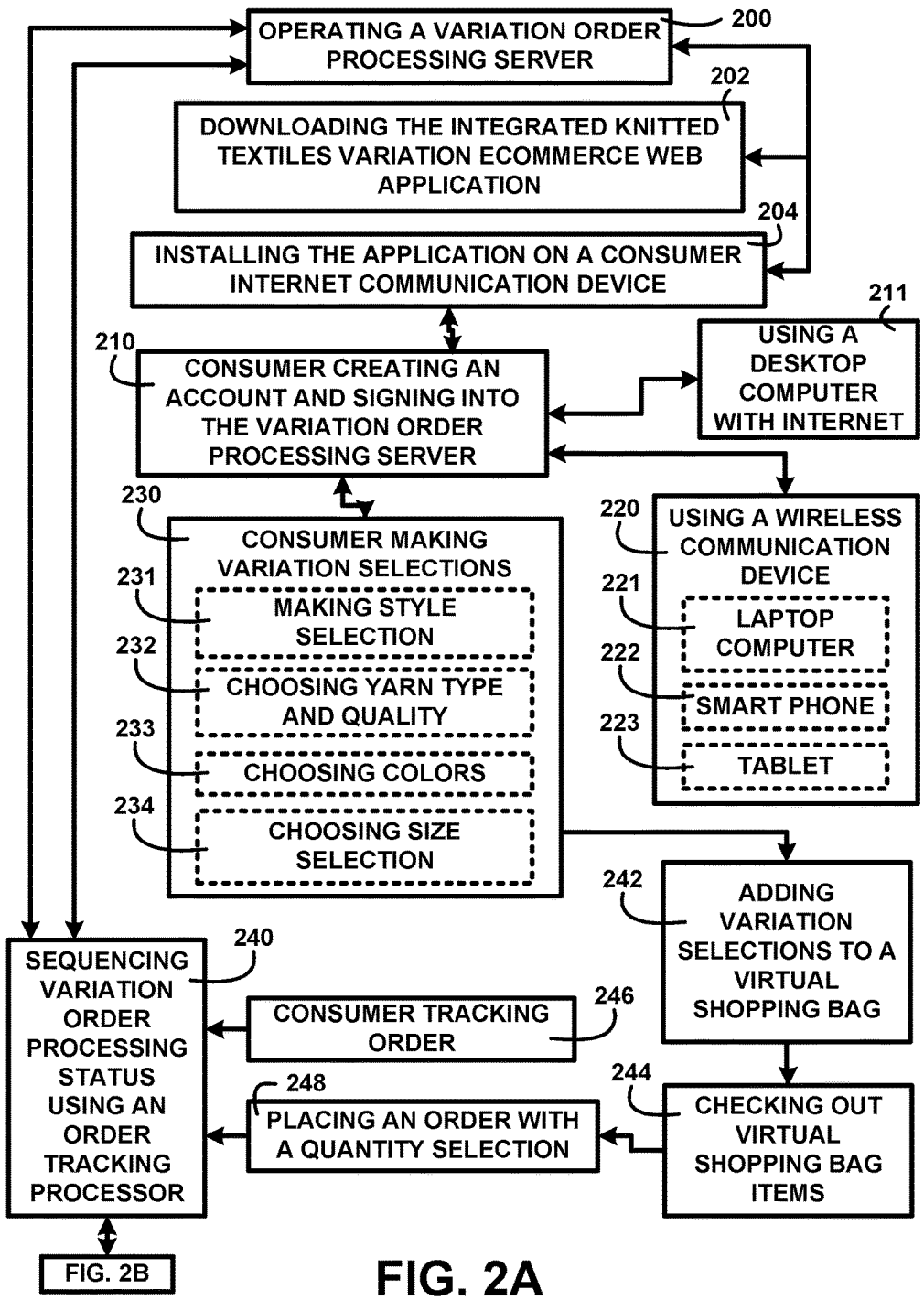
FIG. 2A shows a block diagram of an overview flow chart of integrated knitted textiles system and method of one embodiment.

Detailed Description:

FIG. 2A shows a block diagram of an overview flow chart of integrated knitted textiles system and method of one embodiment. FIG. 2A shows operating a variation order processing server 200. The variation order processing server 200 processes downloading the integrated knitted textiles variation ecommerce web application 202 and installing the application on a consumer internet device communication device 204. A consumer creating an account and signing into the variation order processing server 210 can be using a desktop computer with internet 211 of one embodiment.

A consumer creating an account and signing into the variation order processing server 210 can be using a wireless communication device 220 including laptop computer 221, smart phone 222, and tablet 223. A consumer making variation selections 230 can be making style selection 231, choosing yarn type and quality 232, choosing colors 233 and choosing size selection 234 of one embodiment.

Upon completing selections the consumer can proceed to adding variation selections to a virtual shopping bag 242. During checking out virtual shopping bag items 244 the consumer can continue by placing an order with a quantity selection 248. The consumer order is tracked with sequencing variation order processing status using an order tracking processor 240. The order tracking processor records consumer order tracking 246 throughout the production processing steps of one embodiment. The process flow chart description continues on FIG. 2B.

Figure 2B:
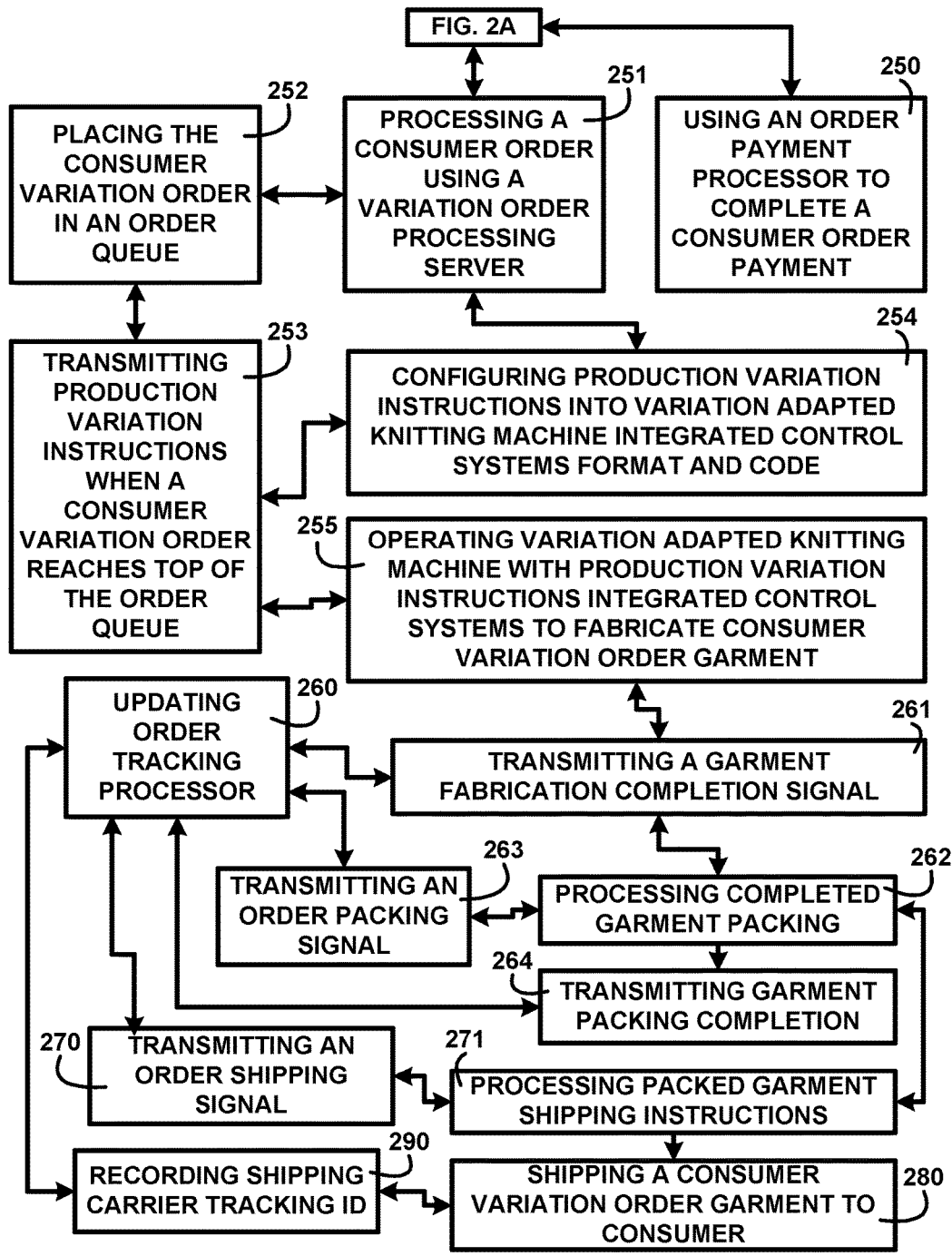
FIG. 2B shows a block diagram of an overview flow chart of integrated knitted textiles system and method order processing of one embodiment.

Integrated Knitted Textiles System and Method Order Processing:

FIG. 2B shows a block diagram of an overview flow chart of integrated knitted textiles system and method order processing of one embodiment. FIG. 2B shows a continuation from FIG. 2A including using an order payment processor to complete a consumer order payment 250. Successful completion of the consumer order payment triggers processing a consumer order using a variation order processing server 251. The variation order processing server 110 of FIG. 1 is used for placing the consumer variation order in an order queue 252 of one embodiment.

The variation order processing server 110 of FIG. 1 is used for configuring production variation instructions into variation adapted knitting machine integrated control systems format and code 254. The variation order processing server 110 of FIG. 1 is used for transmitting production variation instructions when a consumer variation order reaches top of the order queue 253. Operating variation adapted knitting machine with production variation instructions integrated control systems to fabricate consumer variation order garment 255 of one embodiment.

Continuous tracking of a consumer order is updated by transmitting a garment production completion signal 261 for updating the order tracking processor 260. The order tracking processor 130 of FIG. 1 continues the processing by transmitting order packing signal 263. The order packing signal can be configured to include a determination of the packing materials including a packing box size. The packing materials determined are paired with the completed garment for processing completed garment packing 262. Transmitting garment packing completion 264 is sent for updating order tracking processor 260 tracking status of one embodiment.

The order tracking processor 130 of FIG. 1 continues the processing by transmitting an order shipping signal 270 including processing packed garment shipping instructions 271. Processing packed garment shipping instructions 271 can be configured to include automatically printing of shipping documents. A package courier upon completion of shipping preparation processing arranges picking up the packed finished garment for shipping a consumer variation order garment to consumer 280. Recording shipping courier tracking ID 290 data takes place when updating order tracking processor 260. The consumer can sign in with the integrated knitted textiles variation ecommerce web application to get current order tracking status including the shipping tracking data of one embodiment.

Figure 3:
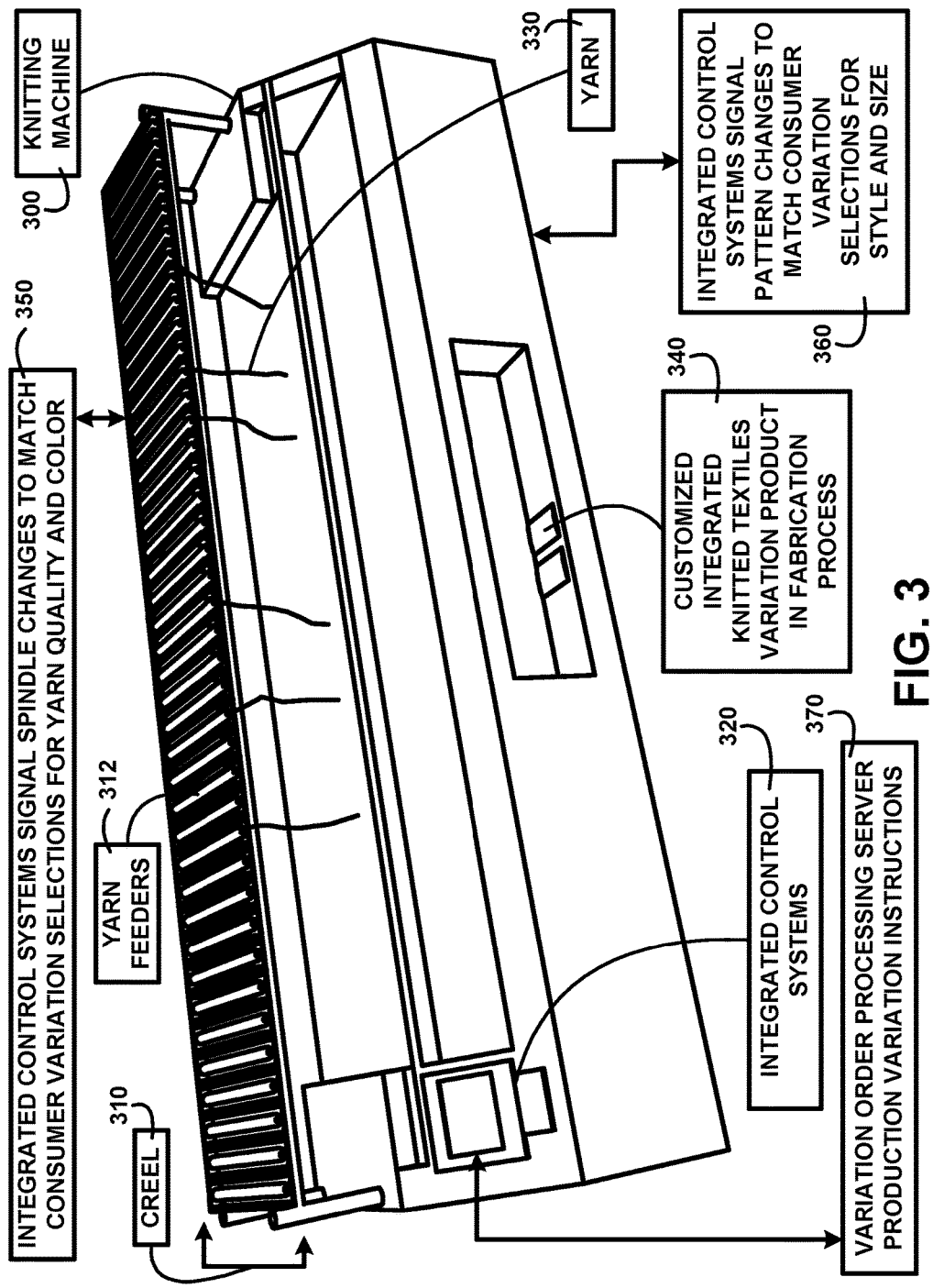
FIG. 3 shows for illustrative purposes only an example of integrated knitted textiles system and method adapted knitting machine of one embodiment.

Integrated Knitted Textiles System and Method Adapted Knitting Machine:

FIG. 3 shows for illustrative purposes only an example of integrated knitted textiles system and method adapted knitting machine of one embodiment. FIG. 3 shows a knitting machine 300 including a creel 310 housing a series of a plurality of yarn feeders 312 to feed yarn 330 into the integrated knitted textiles system and method adapted knitting machine. The knitting machine 300 is adapted for use with the integrated knitted textiles system and method for example to include installation of integrated control systems 320. The integrated control systems 320 receive variation order processing server production variation instructions 370. Integrated control systems signal yarn feeder changes to match consumer variation selections for yarn quality and color 350. Integrated control systems signal pattern changes to match consumer variation selections including for example style and size 360 of one embodiment.

Variation order processing server production variation instructions 370 can include instructions for operating specialized fixtures to perform knitted variation patterning. Adaptations can include knitting machines CNC accessories paired with the integrated control systems. FIG. 3 shows a customized integrated knitted textiles variation product in production process 340 controlled by the integrated control systems 320 processing of the variation order processing server production variation instructions 370 of one embodiment.

Web Application Consumer Account Page:

FIG. 4A shows a block diagram of an overview flow chart of web application consumer account page of one embodiment. FIG. 4A shows a consumer creating an account 400 using an integrated knitted textiles variation ecommerce web application consumer account page 410. The integrated knitted textiles variation ecommerce web application consumer account page 410 gives the consumer an option to sign in 402 if they already have an account. A shopping bag icon 404 is for use in placing an integrated knitted textiles variation order. The consumer inputs account information 416 including for example first name, last name and email address of one embodiment.

The consumer can indicate whether they are subscribed to newsletter 418. The consumer can enter an account password 420. The consumer may change their account password 420 by entering an old password, new password, confirm password and then save changes 425. The integrated knitted textiles variation ecommerce web application consumer account page 410 can be used to check an account, account details, order history, addresses and logout of one embodiment.

Web Application Consumer Addresses Page:

FIG. 4B shows a block diagram of an overview flow chart of web application consumer addresses page of one embodiment. FIG. 4B shows a web application consumer addresses page 440 with the sign in 402 and shopping bag icon 404. The web application consumer addresses page 440 is automatically populated with a first name and last name of the account data from the variation order processing server 110. The consumer may input a street address 460, country 461, state or province 462, zip or postal code 463, city 464, and phone 465. The consumer may select the address data entered to set as default billing address 470 and set as default shipping address 472. The consumer may add an address 480 for example a different shipping address and then save changes 425 of one embodiment.

Figure 5A:
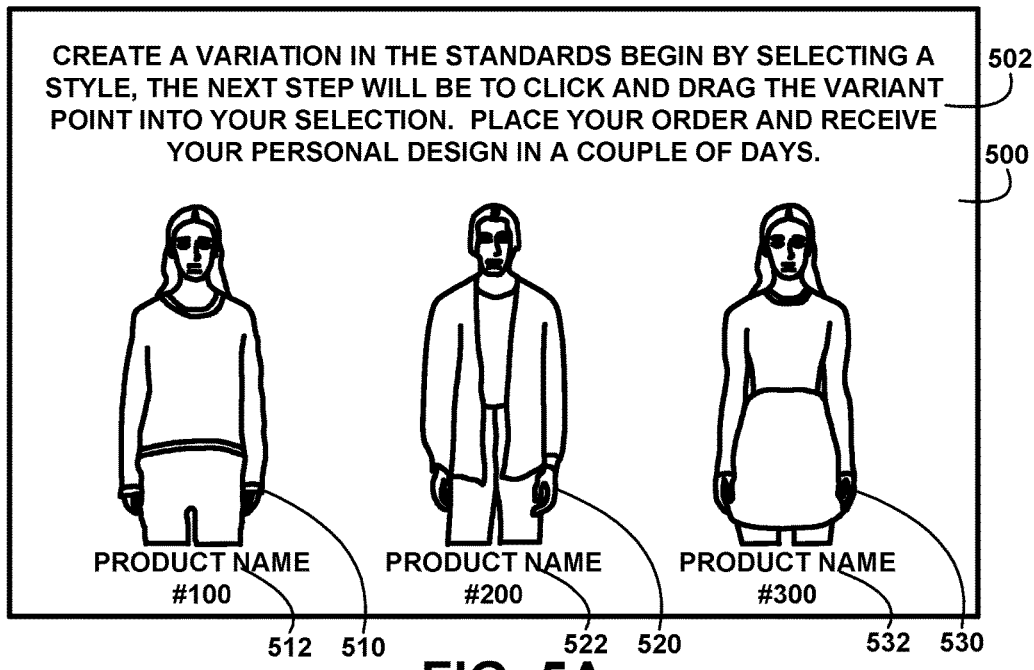
FIG. 5A shows a block diagram of an overview flow chart of web application style selection page of one embodiment.

Web Application Style Selection Page:

FIG. 5A shows a block diagram of an overview flow chart of web application style selection page of one embodiment. FIG. 5A shows a web application style selection page 500. The web application style selection page 500 with instructions for the consumer to create a variation in the standards begin by selecting a style, the next step will be to click and drag the variant point into your selection. Place your order and receive your personal design in a couple of days. 502. FIG. 5A shows for example apparel style #100 510 with an identifying product name #100 512 and number. Other styles are displayed including for example apparel style #200 520 with product name #200 522 and apparel style #300 530 with product name #300 532 for a selection by the consumer garment style selection of one embodiment.

Figure 5B:
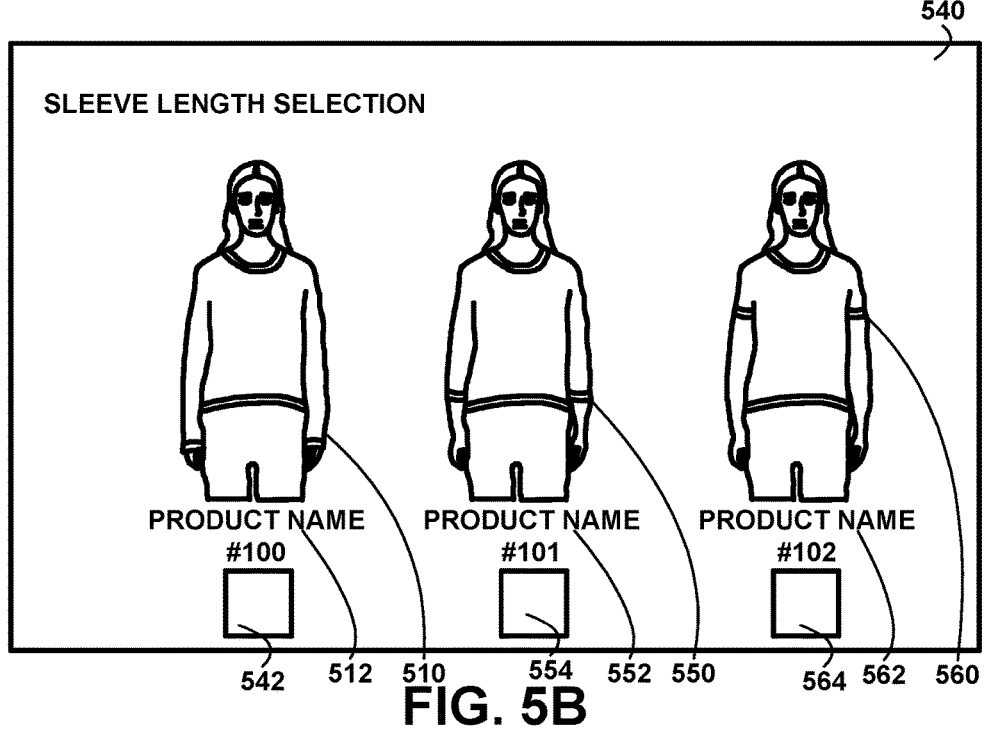
FIG. 5B shows for illustrative purposes only an example of web application sleeve length variation selection page of one embodiment.

Web Application Sleeve Length Variation Selection Page:

FIG. 5B shows for illustrative purposes only an example of web application sleeve length variation selection page of one embodiment. FIG. 5B shows a web application sleeve length variation selection page 540. In this example the web application sleeve length variation selection page 540 displays apparel style #100 510 with product name #100 512 and an apparel style #100 selection box 542. Expanding the selection to other sleeve variations web application sleeve length variation selection page 540 shows apparel style #101 ¾ sleeve 550 with product name #101 552 and an apparel style #101 selection box 554 and apparel style #102 short sleeve 560 with product name #102 562 and an apparel style #102 selection box 564. Other sleeve variation may be shown including for example a sleeveless variation not shown of one embodiment.

Figure 6:
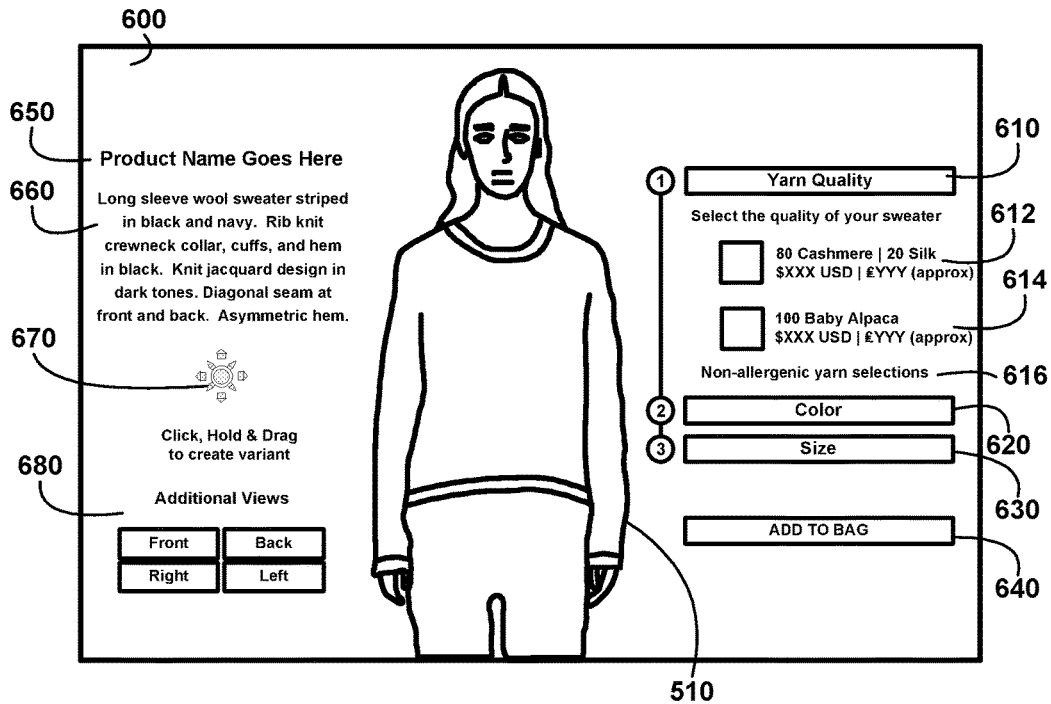
FIG. 6 shows for illustrative purposes only an example of web application yarn quality variation selection page of one embodiment.

Web Application Yarn Quality Variation Selection Page:

FIG. 6 shows for illustrative purposes only an example of web application yarn quality variation selection page of one embodiment. FIG. 6 shows a web application yarn quality variation selection page 600. The web application yarn quality variation selection page 600 shows in this example the apparel style #100 510 selected by the consumer. The consumer may select a variation in yarn quality 610. The consumer is presented with choices to select the quality of your sweater including for example 80 cashmere|20 silk $xxx USD|£yyy (approx) 612 including a selection box. Another selection choice may include 100 baby alpaca $xxx USD|£yyy (approx) 614 including a selection box. The yarn quality variation selection may include non-allergenic yarn selections 616, selections not shown, for those consumers who have fabric material allergies for example wool of one embodiment.

FIG. 6 shows other selection sections that include color 620 and size 630. A selection to add to bag 640 is used for ordering a consumer garment with variation selections. Also shown is a location for product name goes here 650 and a style description long sleeve wool sweater striped in black and navy. Rib knit crewneck collar, cuffs, and hem in black. Knit jacquard design in dark tones. Diagonal seam at front and back. Asymmetric hem 660. A click, hold & drag icon 670 is available to click, hold & drag to create variant 680 including additional views including front, back, right and left of one embodiment.

Figure 7A:
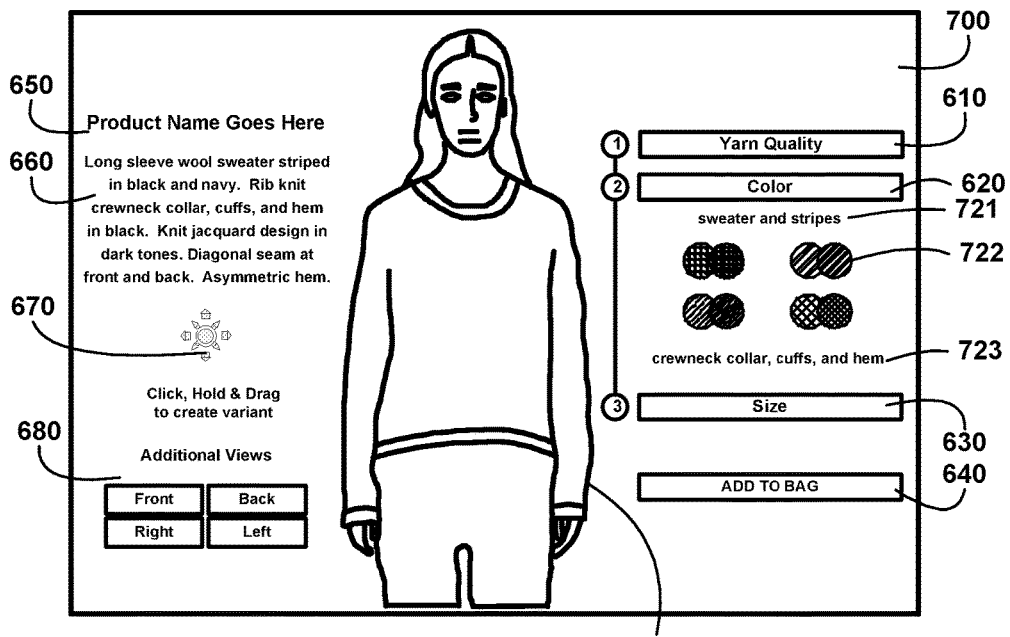
FIG. 7A shows for illustrative purposes only an example of web application color selection page of one embodiment.

Web Application Color Selection Page:

FIG. 7A shows for illustrative purposes only an example of web application color selection page of one embodiment. FIG. 7A shows a web application color selection page 700. Shown is the consumer selected apparel style #100 510. The consumer can select colors for the selected apparel style #100 510 with the yarn quality 610 variation selected. Variation selections for color 620 include colors for a sweater and stripes 721 including base and complimentary color selections 722 and additional different colors for garment trim elements including crewneck collar, cuffs, and hem 723 colors if the consumer desires of one embodiment.

FIG. 7A also shows, size 630, add to bag 640, product name goes here 650, long sleeve wool sweater striped in black and navy. Rib knit crewneck collar, cuffs, and hem in black. Knit jacquard design in dark tones. Diagonal seam at front and back. Asymmetric hem 660, click, hold & drag icon 670, click, hold & drag to create variant 680 with additional views including front, back, right and left of one embodiment.

Figure 7B:
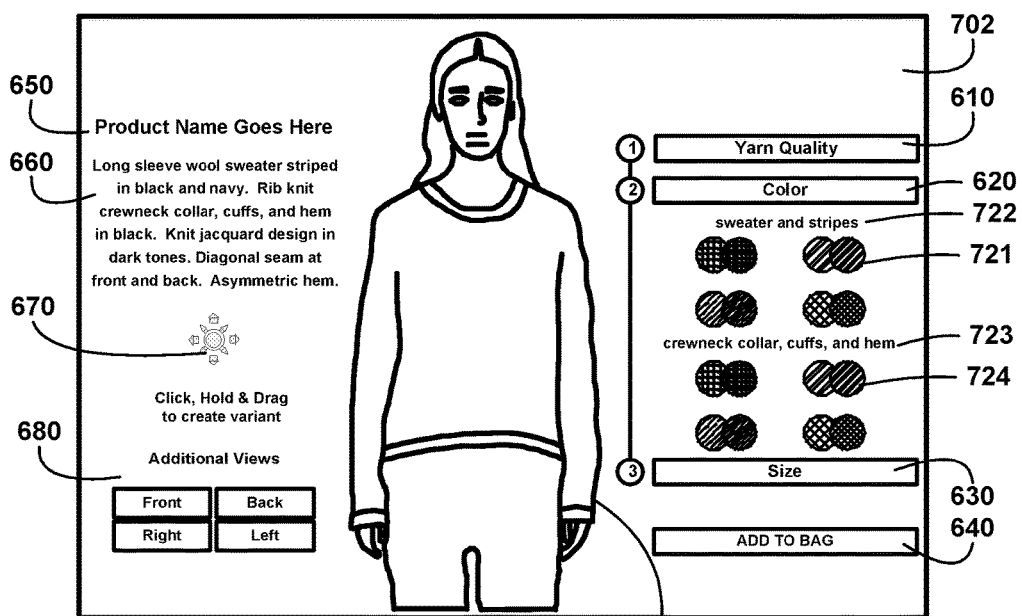
FIG. 7B shows for illustrative purposes only an example of web application trim color selection page of one embodiment.

Web Application Trim Color Selections:

FIG. 7B shows for illustrative purposes only an example of web application trim color selections of one embodiment. FIG. 7B shows web application trim color selections 702 for the consumer style selection apparel style #100 510 in addition to the yarn quality 610 and color 620 selections for sweater and stripes 721 including base and complimentary color selections 722. The crewneck collar, cuffs, and hem trim color selections 723 include crewneck collar, cuffs, and hem trim color selections 724 of one embodiment.

FIG. 7B also shows, size 630, add to bag 640, product name goes here 650, long sleeve wool sweater striped in black and navy. Rib knit crewneck collar, cuffs, and hem in black. Knit jacquard design in dark tones. Diagonal seam at front and back. Asymmetric hem 660, click, hold & drag icon 670, click, hold & drag to create variant 680 with additional views including front, back, right and left of one embodiment.

Figure 8A:
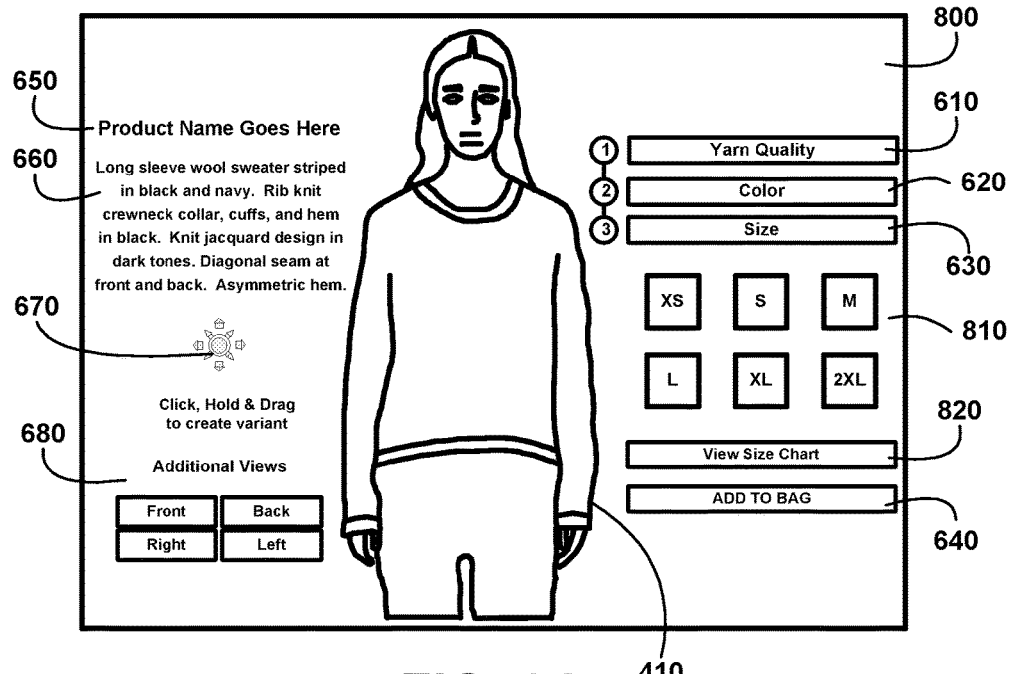
FIG. 8A shows for illustrative purposes only an example of web application size selection page of one embodiment.

Web Application Size Selection Page:

FIG. 8A shows for illustrative purposes only an example of web application size selection page: of one embodiment. FIG. 8A shows a web application size selection page 800. Consumer variation selections in addition to yarn quality 610 and color 620 include the size 630 variation selections for the apparel style #100 510. The size 630 variation includes size selections 810 including XS, S, M, L, XL AND 2XL. The consumer may wish to view size chart 820 to clearly understand size equivalents of one embodiment.

FIG. 8A also shows add to bag 640, product name goes here 650, long sleeve wool sweater striped in black and navy. Rib knit crewneck collar, cuffs, and hem in black. Knit jacquard design in dark tones. Diagonal seam at front and back. Asymmetric hem 660, click, hold & drag icon 670, click, hold & drag to create variant 680 with additional views including front, back, right and left of one embodiment.

Figure 8B:
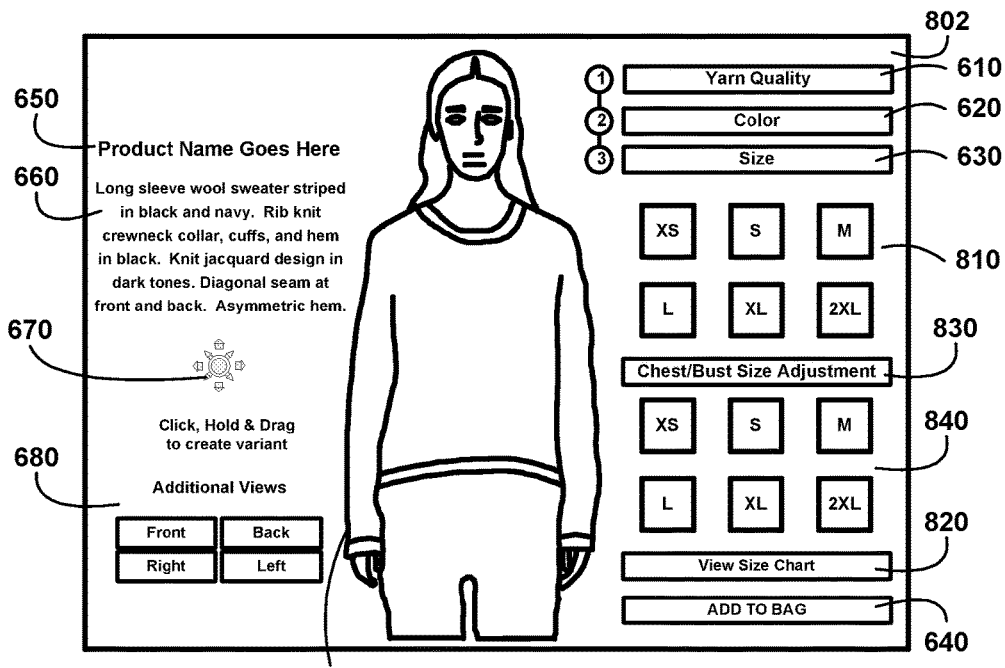
FIG. 8B shows for illustrative purposes only an example of web application chest/bust size adjustment page of one embodiment.

Web Application Chest/Bust Size Adjustment Page:

FIG. 8B shows for illustrative purposes only an example of web application chest/bust size adjustment page: of one embodiment. FIG. 8B shows a web application chest/bust size adjustment page 802. Not all consumers are physically the same. Size variation selections can include a broader body type, for example the athletic male who has a larger chest but narrow waist, women with larger bust to waist proportions, to create a variation that affords them a more tapered fit rather than having to select larger sizes to accommodate the top while being baggy around the waist. In addition to apparel style #100 510 variation selections for yarn quality 610, color 620, size 630, size selections 810 XS, S, M, L, XL AND 2XL the consumer may also select a chest/bust size adjustment 830. Chest/bust size adjustment selections 840 include XS, S, M, L, XL AND 2XL and the consumer may wish to view size chart 820 to check sizing equivalents. FIG. 8B also shows add to bag 640, product name goes here 650, long sleeve wool sweater striped in black and navy. Rib knit crewneck collar, cuffs, and hem in black. Knit jacquard design in dark tones. Diagonal seam at front and back. Asymmetric hem 660, click, hold & drag icon 670, click, hold & drag to create variant 680 with additional views including front, back, right and left of one embodiment.

Figure 9:
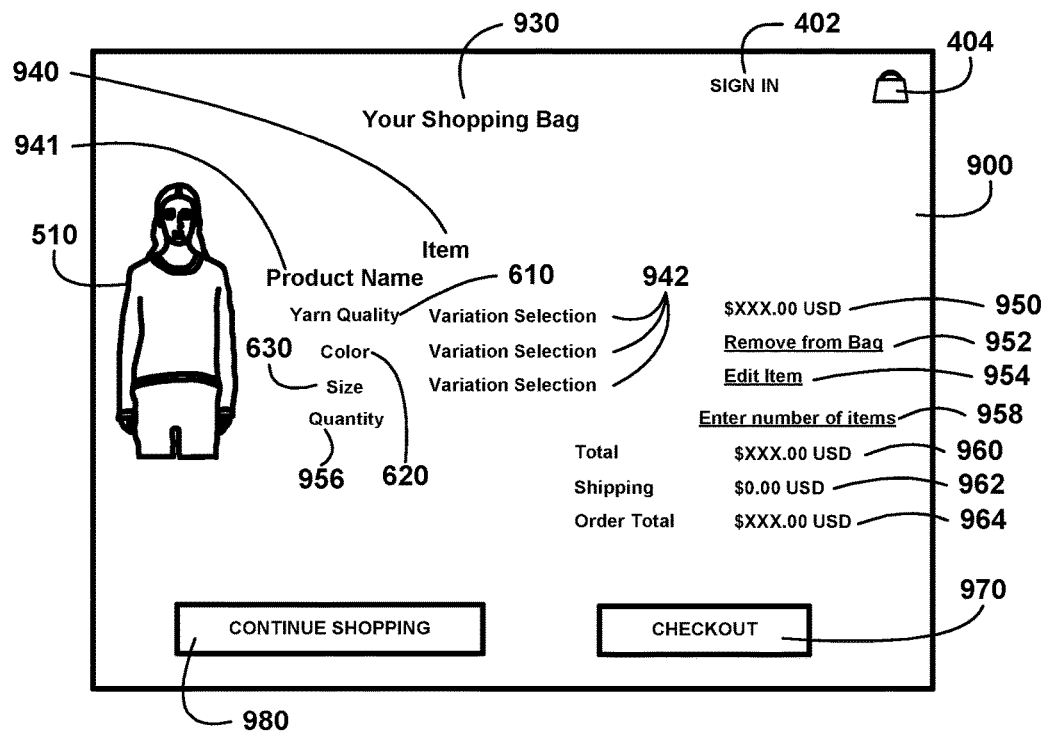
FIG. 9 shows for illustrative purposes only an example of web application your shopping bag page of one embodiment.

Web Application Your Shopping Bag Page:

FIG. 9 shows for illustrative purposes only an example of web application your shopping bag page: of one embodiment. FIG. 9 shows a web application your shopping bag page 900. The web application your shopping bag page 900 includes the sign in 402 and shopping bag icon 404. A your shopping bag 930 page displays the apparel style #100 510 under item 940, a product name 941, in this example product name #100 512, and a variation selection 942 for yarn quality 610, color 620 and size 630 for each consumer variation selection. The web application your shopping bag page 900 also provides a quantity 956 selection where the consumer can enter number of items 958 for a particular selection for example a group wanting to dress alike. The web application your shopping bag page 900 displays an item price $xxx.00 USD 950. The consumer is given the opportunity to remove from bag and edit item. A total $xxx.00 USD 960 for the garment including shipping $0.00 USD 962 and an order total $xxx.00 USD 964. The consumer can select to checkout 970 and also to continue shopping 980 of one embodiment.

Figure 10:
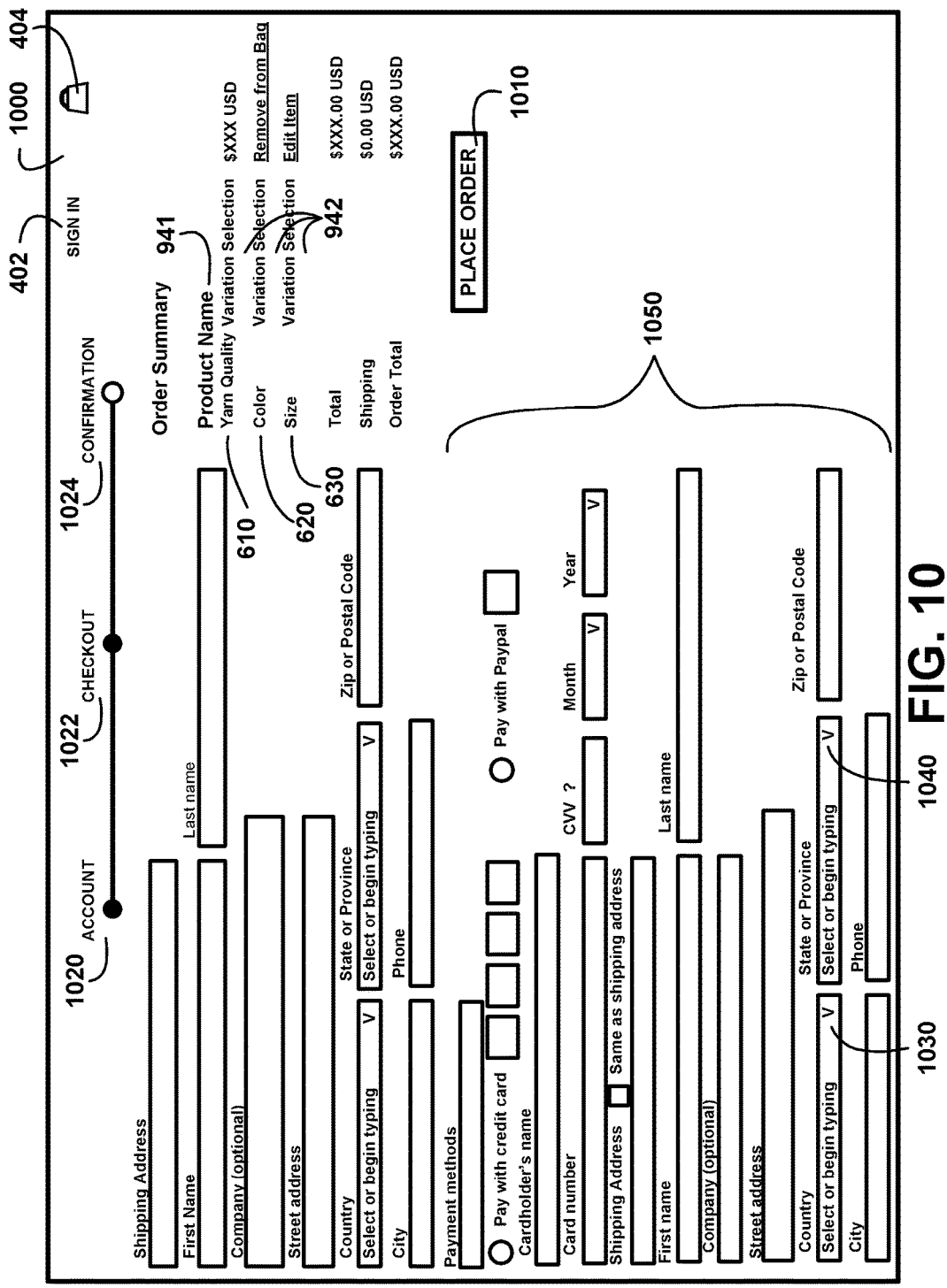
FIG. 10 shows for illustrative purposes only an example of web application place order page of one embodiment.

Web Application Place Order Page:

FIG. 10 shows for illustrative purposes only an example of web application place order page: of one embodiment. FIG. 10 shows a web application place order page 1000 that includes the sign in 402 and shopping bag icon 404. An ordering status is shown that includes account 1020, checkout 1022 and confirmation 1024 for consumer awareness of the current ordering position. The web application place order page 1000 automatically populates the display with the product name 941, yarn quality 610, color 620, size 630 and variation selection 942 for each. The web application place order page 1000 is also showing the prices, consumer personal data which is populated from the recorded consumer account data. Input areas are available for consumer payment data 1050 including a country dropdown entry 1030 and state or province dropdown entry 1040. When completed the consumer can select to place order 1010 of one embodiment.

Figure 11A:
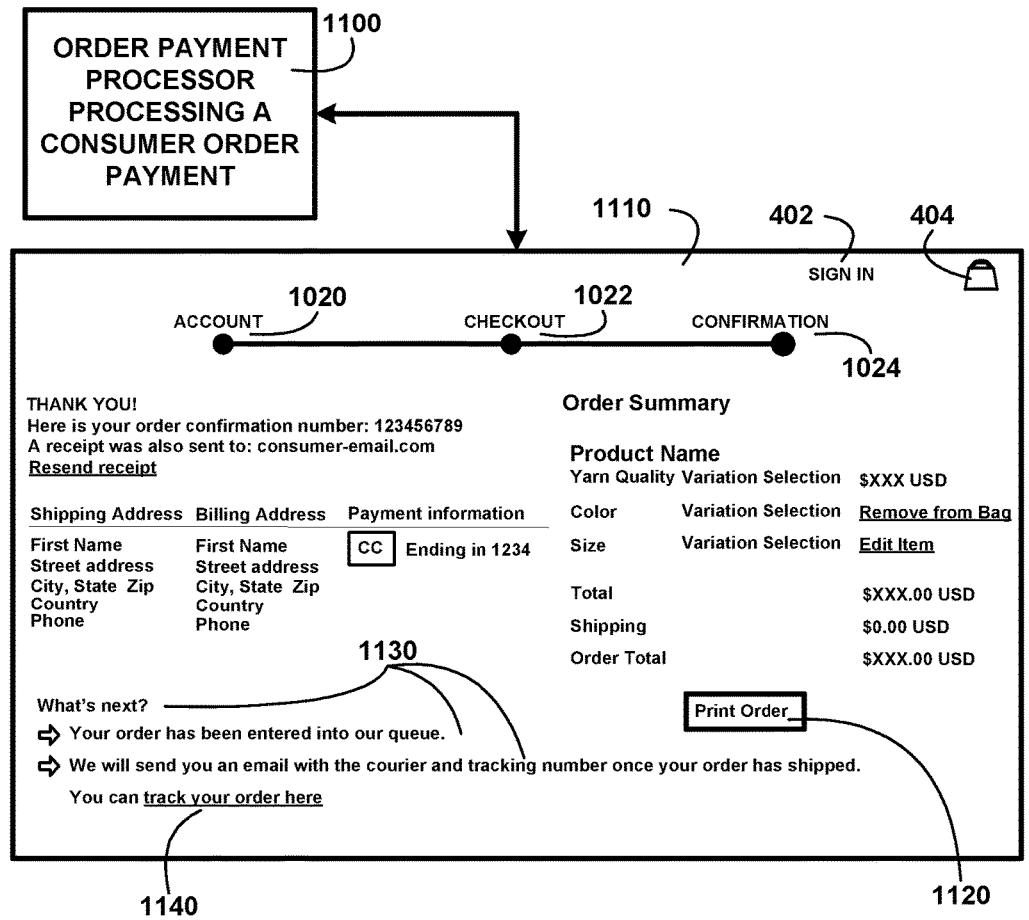
FIG. 11A shows a block diagram of an overview of web application order confirmation page of one embodiment.

Web Application Order Confirmation Page:

FIG. 11A shows a block diagram of an overview of web application order confirmation page of one embodiment. FIG. 11A shows order payment processor processing a consumer order payment 1100 with a web application order confirmation page 1110. The web application order confirmation page 1110 also shows the sign in 402, shopping bag icon 404 and ordering status account 1020, checkout 1022, and confirmation 1024. The web application order confirmation page 1110 is showing the consumer payment data populated with account data. The consumer may select to print order 1120. The web application order confirmation page 1110 also provides consumer guidance on what's next? 1130 including your order has been entered into our queue and we will send you an email with the courier and tracking number once your order has shipped. The consumer may select you can track your order here 1140 to follow the order status of one embodiment.

Figure 11B:
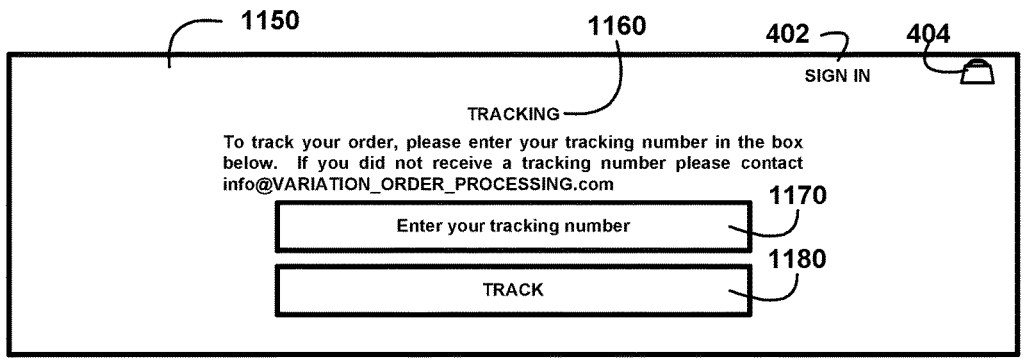
FIG. 11B shows for illustrative purposes only an example of web application order tracking page of one embodiment.

Web Application Order Tracking Page:

FIG. 11B shows for illustrative purposes only an example of web application order tracking page of one embodiment. FIG. 11B shows a web application order tracking page 1150 including the sign in 402 and shopping bag icon 404. The web application order tracking page 1150 provides the consumer the opportunity of tracking 1160 their order. The consumer may enter your tracking number 1170 and select track 1180 to receive a current status of the order of one embodiment.

Figure 12:
FIG. 12 shows for illustrative purposes only an example of web application order history page of one embodiment.

Web Application Order History Page:

FIG. 12 shows for illustrative purposes only an example of web application order history page of one embodiment. FIG. 12 shows a web application order history page 1230 including the sign in 402 and shopping bag icon 404. The web application order history page 1230 displays previous orders including any current order that has been placed showing an order no. 1232, order date 1234, total 1236 and status 1238 of one embodiment.

Figure 13:
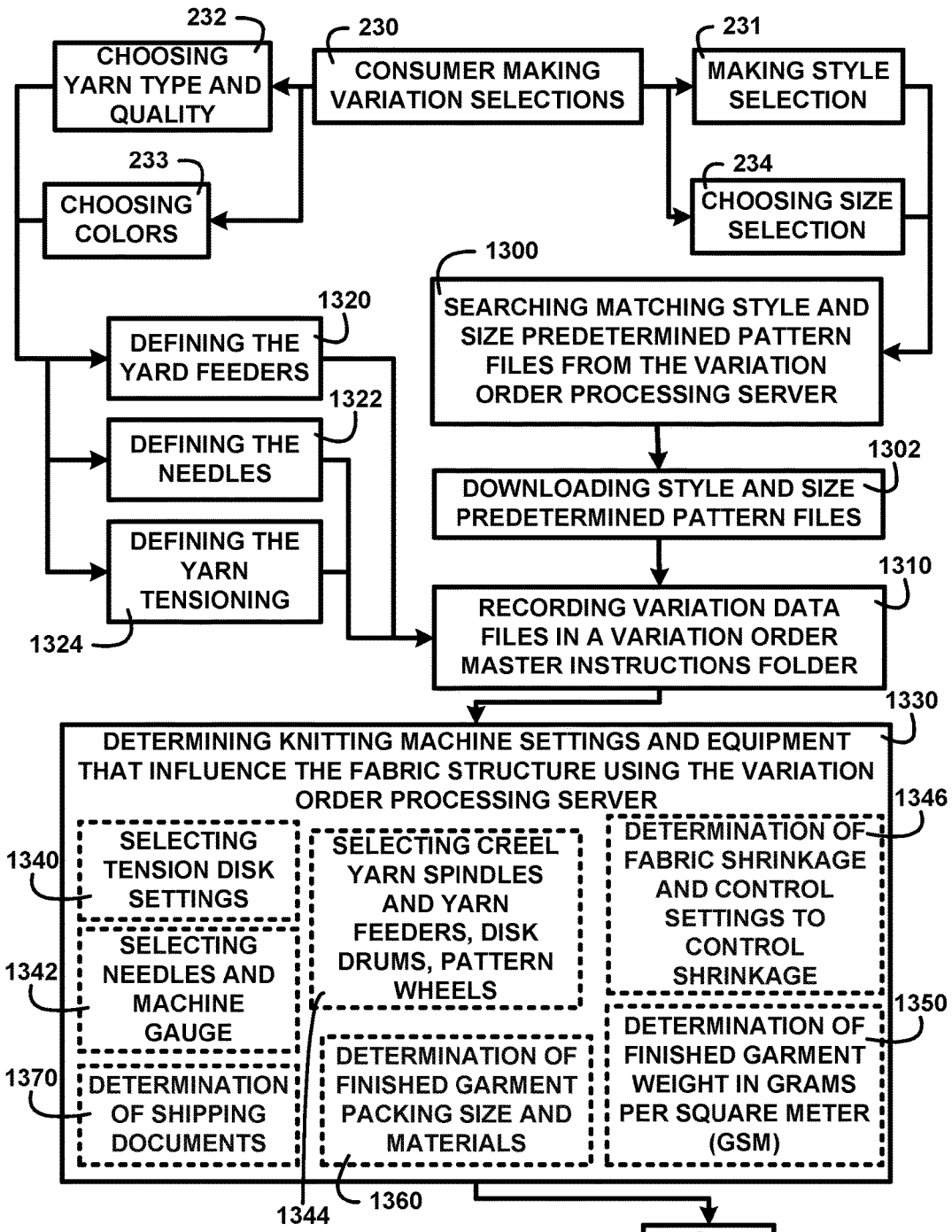
FIG. 13 shows for illustrative purposes only an example of consumer variation selections processing of one embodiment.

Consumer Variation Selections Processing:

FIG. 13 shows for illustrative purposes only an example of consumer variation selections processing of one embodiment. FIG. 13 shows the consumer making variation selections 230. The consumer making style selection 231 and choosing size selection 234 begins the order processing with searching matching style and size predetermined pattern files from the variation order processing server 1300. The style and size search is followed by downloading style and size predetermined pattern files 1302 and recording variation data files in the variation order master instructions folder 1310 of one embodiment.

The consumer continuation of variation selections including choosing yarn type and quality 232 and choosing colors 233 initiates defining the yarn feeders 1320, defining the needles 1322, defining the yarn tensioning 1324 and recording variation data files in a variation order master instructions folder 1310. The variation data files are used for determining knitting machine settings and equipment that influence the fabric structure using the variation order processing server 1330. The variation order processing server 110 of FIG. 1 calculates and processes data for selecting tension disk settings 1340, selecting needles and machine gauge 1342, selecting creel yarn spindles and yarn feeders, disk drums, pattern wheels 1344. The variation order processing server 110 of FIG. 1 calculates and processes data for determination of fabric shrinkage and control settings to control shrinkage 1346, determination of finished garment weight in grams per square meter (GSM) 1350 and a shipping weight in pounds, determination of finished garment packing size and materials 1360, and determination of shipping documents 1370 of one embodiment. The processing is further described in FIG. 14 of one embodiment.

Figure 14:
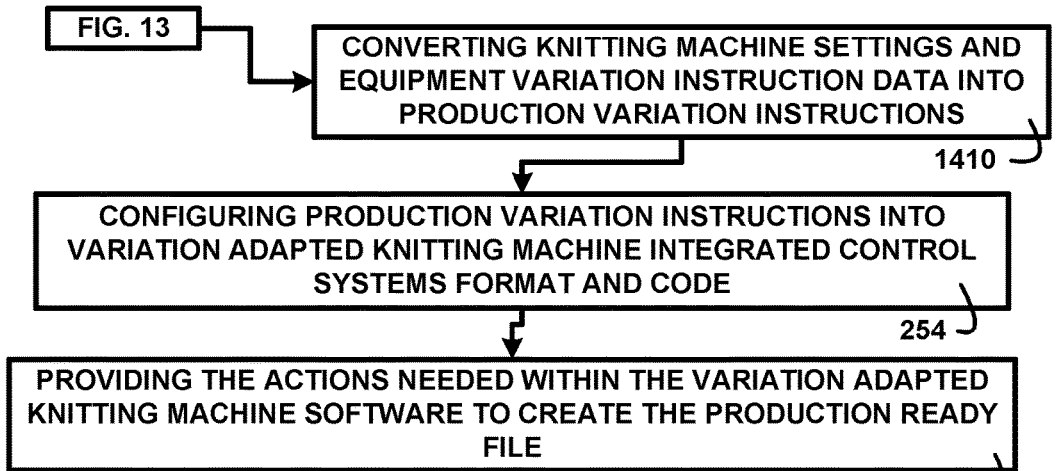
FIG. 14 shows for illustrative purposes only an example of integrated control systems format and code of one embodiment.

Integrated Control Systems Format and Code:

FIG. 14 shows for illustrative purposes only an example of integrated control systems format and code of one embodiment. FIG. 14 shows a continuation from FIG. 13 including converting knitting machine settings and equipment variation instruction data into production variation instructions 1410. The production variation instruction data converter processor 142 of FIG. 1 converts production variation instructions configuring production variation instructions into variation adapted knitting machine integrated control systems format and code 254. The variation adapted knitting machine integrated control systems format and code is providing the actions needed within the variation adapted knitting machine software to create the production ready file 1400 of one embodiment.

Figure 15:
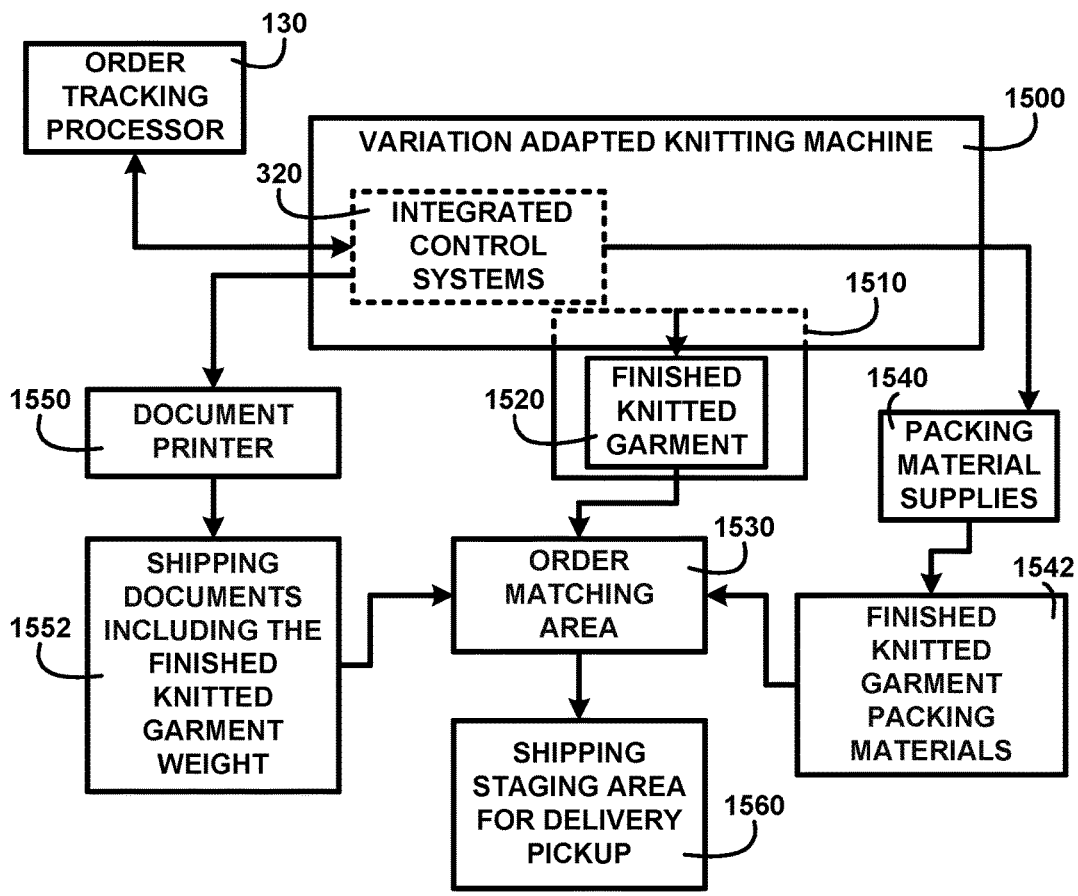
FIG. 15 shows for illustrative purposes only an example of finished variation garment processing of one embodiment.

Finished Variation Garment Processing:

FIG. 15 shows for illustrative purposes only an example of finished variation garment processing of one embodiment. FIG. 15 shows the order tracking processor 130 transmitting processing data to the integrated control systems 320. The integrated control systems 320 instructs a variation adapted knitting machine 1500 on the actions needed within the variation adapted knitting machine to create the consumer selected variation garment. The knitted garment when completed is conveyed through a finished knitted garment outlet 1510. A finished knitted garment 1520 can be manually or automatically conveyed to an order matching area 1530. The order tracking processor 130 upon knitted garment production completion instructs the integrated control systems 320 on the packing material supplies 1540 that have been determined. Finished knitted garment packing materials 1542 can be manually or automatically conveyed to the order matching area 1530. The order tracking processor 130 can instruct the integrated control systems 320 with a coupled document printer 1550 to print shipping documents including the finished garment weight 1552. The printed shipping documents can manually or automatically be conveyed to the order matching area 1530. The completed finished garment packing and shipping documentation is followed by manually or automatically conveyed the finished knitted garment package to a shipping staging area for delivery pick-up 1560 of one embodiment.

In another embodiment the finished knitted garment 1520 can be folded using an automatic folding device. The finished knitted garment 1520 can be wrapped and placed in for example a packing box automatically using an automated packing device. The shipping documents including the finished knitted garment weight 1552 can be affixed to the shipping package automatically and automatically placed on for example a conveying device and conveyed to the shipping staging area for delivery pick-up 1560 of one embodiment.

Variation Garment Processing:

Variation garment processing incorporates an integrated knitted textiles system and method. An integrated knitted textiles system and method includes a knitted textile consumer variation website for processing variation knitted garment orders and production. An integrated knitted textiles system and method includes an integrated knitted textiles variation ecommerce web application for consumer use in selecting knitted garment variation and ordering on the knitted textile consumer variation website. An integrated knitted textiles system and method includes a variation order processing server for processing consumer variation selection orders and creating knitted garment variation production instructions. An integrated knitted textiles system and method includes an order tracking processor for consumer variation selection order production sequencing and order tracking. At least one integrated knitted textiles variation knitting machine adaptation for creating interactive processing and knitting machine communications of adapted knitted machine instructions. At least one production variation instruction data converter processor for converting consumer variation selections into adapted knitted machine instructions of one embodiment.

The integrated knitted textiles variation ecommerce web application is configured to communicate between the variation order processing server and at least a consumer internet device communication device including a desktop computer, and a wireless communication device including a laptop computer, smart phone, and tablet. The variation order processing server is configured to receive, transmit, calculate, determine, define, translate and record data from at least a consumer internet device communication device, an order payment processor, an order tracking processor and an order tracking processor. The variation order processing server is configured for converting consumer style and variation selections data into variation adapted knitting machine integrated control systems format and code used to transmit coded operating instructions to a variation adapted knitting machine for production of variation finished knitted garments. The variation order processing server is configured for searching style and size predetermined pattern files matching consumer style and variation selections and downloading and recording matching style and size predetermined pattern files and variation data files in a variation order master instructions folder of one embodiment.

The variation order processing server is configured for calculating and processing variation selection data for defining, selecting and determining variation adapted knitting machine production equipment and settings including creel yarn spindles and yarn feeders, needles, yarn tensioning, tension disk settings, machine gauge, disk drums, pattern wheels, fabric shrinkage and control settings to control shrinkage and recording results in a variation order master instructions folder. The variation order processing server is configured for calculating and processing variation selection data for defining, selecting and determining a variation finished knitted garment weight in grams per square meter and a shipping weight in pounds, a variation finished knitted garment packing size and materials and a variation finished knitted garment shipping documents of one embodiment.

Order tracking processor is configured for tracking and sequencing variation order processing throughout the production processing including placing the order on a production queue, transmitting production instructions to a variation adapted knitting machine when the variation order reaches top position on the production queue, transmitting packing instructions when a production completion signal is received, transmitting shipping instructions when a packing completion signal is received and recording a courier tracking number when an order shipped signal is received. At least one integrated knitted textiles variation knitting machine adaptation is configured to include integrated control systems coupled to a knitting machine of one embodiment.

An additional embodiment includes processing variation knitted garment orders and production using a knitted textile consumer variation website. Processing a variation knitted garment order includes selecting knitted garment variations and ordering on the knitted textile consumer variation website using an integrated knitted textiles variation ecommerce web application. Processing consumer variation selection orders and creating knitted garment variation production instructions using a variation order processing server. Sequencing production processing steps and tracking order status using an order tracking processor of one embodiment.

Creating interactive processing and knitting machine communications of adapted knitted machine instructions using an integrated control systems adaptation coupled to a knitting machine. Processing a variation knitted garment order includes converting consumer variation selections into adapted knitted machine instructions using at least one production variation instruction data converter processor. Processing variation knitted garment orders and production includes communicating between a variation order processing server and at least a consumer internet device communication device including a desktop computer, and a wireless communication device including a laptop computer, smart phone, and tablet of one embodiment.

Processing consumer variation selection orders and creating knitted garment variation production instructions includes searching style and size predetermined pattern files matching consumer style and variation selections and downloading and recording matching style and size predetermined pattern files and variation data files in a variation order master instructions folder. Processing consumer variation selection orders and creating knitted garment variation production instructions includes calculating and processing variation selection data for defining, selecting and determining variation adapted knitting machine production equipment and settings including creel yarn spindles and yarn feeders, needles, yarn tensioning, tension disk settings, machine gauge, disk drums, pattern wheels, fabric shrinkage and control settings to control shrinkage and recording results in a variation order master instructions folder of one embodiment.

Sequencing production processing steps includes sequencing production processing steps throughout the production processing including placing the order on a production queue, transmitting production instructions to a variation adapted knitting machine when the variation order reaches top position on the production queue, transmitting packing instructions when a production completion signal is received, transmitting shipping instructions when a packing completion signal is received and recording a courier tracking number when an order shipped signal is received. Converting consumer variation selections into adapted knitted machine instructions includes configuring production variation instructions into variation adapted knitting machine integrated control systems format and code of one embodiment.

In another embodiment variation garment processing can be configured to include a knitted textile consumer variation website to process variation selection knitted garment orders using an internet communication device with an integrated knitted textiles variation ecommerce web application installed. A variation order processing server to process a variation selection knitted garment order and convert the variation selections into variation production instructions. An integrated control systems adaptation is configured to couple to a knitting machine to receive variation production instructions and to conduct knitted machine operations according to the variation production instructions. An order tracking processor is configured to track a consumer variation selection order and to sequence production processing of the consumer variation selection order of one embodiment.

Communication between elements includes an internet communication device with an integrated knitted textiles variation ecommerce web application installed and configured to include a desktop computer, and a wireless communication device including a laptop computer, smart phone, and a tablet. A variation order processing server configured for searching style and size predetermined pattern files matching consumer style and variation selections and downloading and recording matching style and size predetermined pattern files and variation data files in a variation order master instructions folder. A variation order processing server configured for calculating and processing variation selection data for defining, selecting and determining variation adapted knitting machine production equipment and settings including creel yarn spindles and yarn feeders, needles, yarn tensioning, tension disk settings, machine gauge, disk drums, pattern wheels, fabric shrinkage and control settings to control shrinkage and recording results in a variation order master instructions folder of one embodiment.

An order tracking processor configured for tracking and sequencing variation order processing throughout the production processing including placing the order on a production queue, transmitting production instructions to a variation adapted knitting machine when the variation order reaches top position on the production queue, transmitting packing instructions when a production completion signal is received, transmitting shipping instructions when a packing completion signal is received and recording a courier tracking number when an order shipped signal is received of one embodiment.

The foregoing has described the principles, embodiments and modes of operation of the embodiments. However, the embodiments should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed is:

1. An integrated knitted textiles system and method, comprising:

receiving consumer variation knitted garment orders data on a knitted textile consumer variation website including receiving a consumer size selection from a size selection box, chest/bust size adjustment selections, style selections including sleeve length variation selection including sleeveless variation, yarn type and quality selections, color selections from at least one selection box on one or more knitted textile consumer variation website web page;

processing variation knitted garment orders and converting the variation knitted garment orders data into knitted garment variation production device instructions including matching style and size predetermined pattern files from a variation order processing server, and recording variation data files in a variation order master instructions folder on the variation order processing server;

selecting knitted garment variations and ordering knitted garment variations on the knitted textile consumer variation website using an integrated knitted textiles variation ecommerce web application;

processing consumer variation selection orders and creating knitted garment production variation instructions using the variation order processing server wherein the variation order processing server is calculating and processing variation data for defining and determining production device instructions including calculating and processing data for determination of fabric shrinkage and control settings to control shrinkage and calculating and processing data for determination of a finished garment weight in grams per square meter (GSM) and a shipping weight in pounds, and finished garment packing size and materials and consumer variation knitted garment orders shipping data;

sequencing consumer variation selection order production and tracking consumer variation selection orders using an order tracking processor;

creating interactive processing and knitting machine communications of adapted knitted machine instructions using at least one integrated knitted textiles variation knitting machine adaptation; and;

converting consumer variation selections into adapted knitted machine instructions using at least one production variation instruction data converter processor for creating a production ready file for use with variation adapted knitting machine integrated control systems to fabricate at least one consumer variation order garment.

2. The integrated knitted textiles system and method of claim 1, wherein receiving consumer variation knitted garment orders on a knitted textile consumer variation website includes a consumer using the integrated knitted textiles variation ecommerce web application is configured to communicate between the variation order processing server and at least one consumer internet device communication device including a desktop computer, alternatively at least one wireless communication device including a laptop computer, smart phone, and tablet.

3. The integrated knitted textiles system and method of claim 1, wherein processing consumer variation selection orders and creating knitted garment variation production instructions using the variation order processing server includes the variation order processing server configured for performing at least receiving the variation knitted garment orders data, transmitting the knitted garment variation production device instructions, processing the variation knitted garment orders data, and recording the variation knitted garment orders data from at least one consumer internet device communication device, an order payment processor the order tracking processor and knitting machine settings and equipment that influence the fabric structure.

4. The integrated knitted textiles system and method of claim 1, wherein converting consumer variation selections into adapted knitted machine instructions using the variation order processing server is configured for converting consumer style and variation selections data into variation adapted knitting machine integrated control systems format and code used to transmit coded operating instructions to a variation adapted knitting machine for production of variation finished knitted garments.

5. The integrated knitted textiles system and method of claim 1, wherein matching style and size predetermined pattern files includes using the variation order processing server configured for searching style and size predetermined pattern files matching consumer style and variation selections and downloading and recording matching style and size predetermined pattern files and variation data files in the variation order master instructions folder.

6. The integrated knitted textiles system and method of claim 1, wherein calculating and processing data for determination of fabric shrinkage and control settings to control shrinkage is configured using the variation order processing server wherein defining the yarn tensioning, and controlling tension disk settings contributes to controlling fabric shrinkage.

7. The integrated knitted textiles system and method of claim 1, wherein calculating and processing data using the variation order processing server is configured for calculating a price of the consumer variation knitted garment order with variations and configured for transmitting the price to and displaying the price on the at least one consumer internet device communication device, wherein the consumer inputs payment data, and wherein the variation order processing server is configured for processing the consumer payment data using an order payment processor and recording upon a successful payment the consumer variation knitted garment order is recorded using the order tracking processor.

8. The integrated knitted textiles system and method of claim 1, wherein tracking consumer variation selection orders using the order tracking processor is configured for tracking and sequencing variation order processing throughout the production processing including placing the order on a production queue, transmitting production instructions to a variation adapted knitting machine when the variation order reaches top position on the production queue, transmitting packing instructions when a production completion signal is received, transmitting shipping instructions when a packing completion signal is received and recording a courier tracking number when an order shipped signal is received for shipping a consumer variation order garment to a consumer.

9. The integrated knitted textiles system and method of claim 1, wherein creating a production ready file for use with variation adapted knitting machine integrated control systems includes adapted knitted machine instructions for selecting tension disk settings, selecting needles and machine gauge, creel yarn spindles and yarn feeders, disk drums, pattern wheels, control settings to control shrinkage, calculated determinations of finished garment weight in grams per square meter and a shipping weight in pounds, a finished garment packing size and packing materials, and shipping data for printing of shipping documents.

10. A method, comprising:
processing variation knitted garment orders and production using a knitted textile consumer variation website on a variation order processing server;

selecting knitted garment variations on a knitted textile consumer variation website including a consumer size selection from a size selection box, chest/bust size adjustment selections, style selections including sleeve length variation selection including a sleeveless variation, yarn type and quality selections, color selections from at least one selection box on one or more knitted textile consumer variation website web page;

ordering on the knitted textile consumer variation website using an integrated knitted textiles variation ecommerce web application installed on a consumer internet device communication device;

processing consumer variation selection orders and creating knitted garment variation production instructions using a variation order processing server configured for calculating and processing data for determination of fabric shrinkage and control settings to control shrinkage and calculating and processing data for determination of a finished garment weight in grams per square meter (GSM) and a shipping weight in pounds, and finished garment packing size and materials and consumer variation knitted garment orders shipping data;

sequencing production processing steps and tracking order status using an order tracking processor;

creating interactive processing and knitting machine communications of adapted knitted machine instructions using variation adapted knitting machine integrated control systems adaptation coupled to a knitting machine creating an adapted knitting machine to fabricate at least one consumer variation order garment; and;

converting consumer variation selections into adapted knitting machine instructions using at least one production variation instruction data converter processor.

11. The method of claim 10, wherein processing variation knitted garment orders and production includes communicating between a variation order processing server and at least a consumer internet device communication device including a desktop computer, and alternatively at least one wireless communication device including a laptop computer, smart phone, and tablet.

12. The method of claim 10, wherein processing consumer variation selection orders and creating knitted garment variation production instructions includes searching style and size predetermined pattern files matching consumer style and variation selections and downloading and recording matching style and size predetermined pattern files and variation data files in a variation order master instructions folder.

13. The method of claim 10, wherein processing consumer variation selection orders and creating knitted garment variation production instructions includes calculating and processing variation selection data for defining, selecting and determining variation adapted knitting machine production equipment and settings including creel yarn spindles and yarn feeders, needles, yarn tensioning, tension disk settings, machine gauge, disk drums, pattern wheels, fabric shrinkage and control settings to control shrinkage and recording results in a variation order master instructions folder.

14. The method of claim 10, wherein sequencing production processing steps includes sequencing production processing steps throughout the production processing including placing the order on a production queue, transmitting production instructions to a variation adapted knitting machine when the variation order reaches top position on the production queue, transmitting packing instructions when a production completion signal is received, transmitting shipping instructions when a packing completion signal is received and recording a courier tracking number when an order shipped signal is received.

15. The method of claim 10, wherein converting consumer variation selections into adapted knitted machine instructions includes configuring production variation instructions into variation adapted knitting machine integrated control systems format and code.

16. An apparatus, comprising:
a knitted textile consumer variation website to process consumer variation selection knitted garment orders;

an integrated knitted textiles variation ecommerce web application installed on at least one consumer internet communication device used for a consumer selecting consumer variation selections including at least one selection including a consumer size selection from a size selection box, chest/bust size adjustment selections, style selections including sleeve length variation selection including a sleeveless variation, yarn type and quality selections, color selections from at least one selection box on one or more knitted textile consumer variation website web page and transmitting the consumer variation selections to the knitted textile consumer variation website;

a variation order processing server to process a variation selection knitted garment order and convert the variation selections into variation production instructions and wherein the variation order processing server is configured for calculating and processing data for determination of fabric shrinkage and control settings to control shrinkage and calculating and processing data for determination of a finished garment weight in grams per square meter (GSM) and a shipping weight in pounds, and finished garment packing size and materials and consumer variation knitted garment orders shipping data;

at least one production variation instruction data converter processor for converting consumer variation selections into adapted knitted machine instructions using variation adapted knitting machine integrated control systems format and code;

an integrated control systems adaptation to couple to a knitting machine to receive variation production instructions and conduct knitted machine operations according to the variation production instructions to fabricate at least one consumer variation order garment; and;

an order tracking processor configured to track a consumer variation selection order and to sequence production processing of the consumer variation selection order.

17. The apparatus of claim 16, further comprising an internet communication device with an integrated knitted textiles variation ecommerce web application installed and configured to include a desktop computer, and alternatively at least one wireless communication device including a laptop computer, smart phone, and tablet.

18. The apparatus of claim 16, further comprising a variation order processing server configured for searching style and size predetermined pattern files for matching consumer style and variation selections and downloading and recording matching style and size predetermined pattern files and variation data files in a variation order master instructions folder.

19. The apparatus of claim 16, further comprising a variation order processing server configured for calculating and processing variation selection data for defining, selecting and determining variation adapted knitting machine production equipment and settings including creel yarn spindles and yarn feeders, needles, yarn tensioning, tension disk settings, machine gauge, disk drums, pattern wheels, fabric shrinkage and control settings to control shrinkage and recording results in a variation order master instructions folder.

20. The apparatus of claim 16, further comprising an order tracking processor configured for tracking and sequencing variation order processing throughout the production processing including placing the order on a production queue, transmitting production instructions to a variation adapted knitting machine when the variation order reaches top position on the production queue, transmitting packing instructions when a production completion signal is received, transmitting shipping instructions when a packing completion signal is received and recording a courier tracking number when an order shipped signal is received.

\* \* \* \* \*